UNITED STATES PATENT OFFICE.

WILHELM PICKHARDT, OF NEW YORK, AND HERMANN ENDEMANN, OF BROOKLYN, ASSIGNORS TO SAID PICKHARDT AND ADOLF KUTTROFF, OF NEW YORK, N. Y.

PREPARATION OF CHINOLINE.

SPECIFICATION forming part of Letters Patent No. 252,846, dated January 24, 1882.

Application filed December 6, 1881. (Specimens.)

To all whom it may concern:

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Medical Compounds, of which the following is a specification.

This invention relates to a medical compound which is obtained by the action of citric acid on chinoline.

In carrying out our invention we take the artificial chinoline of Skraup, or we prepare such artificial chinoline according to the Patent No. 241,738, granted to Zdenko H. Skraup May 17, 1881, and then we free the same from the impurities mixed therewith by treating it with tartaric acid, whereby an acid tartrate of chinoline is obtained, and then liberating from this salt the chinoline by treating its aqueous solution with caustic alkalies, as fully described in another application for a patent bearing even date with this. After the chinoline has been freed from impurities we mix one molecule thereof with one molecule of citric acid dissolved in a small quantity of water. From this solution citrate of chinoline crystallizes in white concentrically-grouped needles, which are separated from the mother-liquor by mechanical means. This salt is very easily soluble in water, and in aqueous solution it gives the reactions of chinoline and citric acid. For instance, by the addition of caustic alkalies the chinoline is liberated, and when freed from the liquid such chinoline forms a colorless oily liquid, which assumes no color on being exposed to the light. If impure chinoline is used for preparing the citrate of chinoline, the salt crystallizes with great difficulty, and it is exceedingly difficult to obtain the same in pure white crystals.

Our citrate of chinoline can be used with great advantage for medical purposes.

What we claim as new, and desire to secure by Letters Patent, is—

As a new article of manufacture, the citrate of chinoline herein described, and having the characteristics above set forth.

In testimony whereof we have hereunto set our hands and seals in the presence of two subscribing witnesses.

WM. PICKHARDT. [L. S.]
    H. ENDEMANN. [L. S.]

Witnesses:
 W. HAUFF,
 E. F. KASTENHUBER.